United States Patent

Mans et al.

(10) Patent No.: US 9,332,617 B2
(45) Date of Patent: May 3, 2016

(54) LIGHTING CONTROL SYSTEM

(71) Applicant: C.P. Electronics Limited, London (GB)

(72) Inventors: Paul Mans, London (GB); Merlin Milner, London (GB)

(73) Assignee: C.P. Electronics Limited (GB)

( * ) Notice: Subject to any disclaimer, the term of this patent is extended or adjusted under 35 U.S.C. 154(b) by 0 days.

(21) Appl. No.: 14/672,069

(22) PCT Filed: Oct. 3, 2013

(86) PCT No.: PCT/GB2013/052581
§ 371 (c)(1),
(2) Date: Mar. 27, 2015

(87) PCT Pub. No.: WO2014/053843
PCT Pub. Date: Apr. 10, 2014

(65) Prior Publication Data
US 2015/0334809 A1 Nov. 19, 2015

(30) Foreign Application Priority Data

Oct. 3, 2012 (EP) .................................... 12187114

(51) Int. Cl.
*H05B 37/02* (2006.01)
*H05B 39/04* (2006.01)
*H05B 41/36* (2006.01)
*H05B 39/08* (2006.01)

(52) U.S. Cl.
CPC ........ *H05B 37/0218* (2013.01); *H05B 37/0227* (2013.01); *H05B 37/0272* (2013.01); *H05B 39/088* (2013.01); *Y02B 20/44* (2013.01); *Y02B 20/46* (2013.01)

(58) Field of Classification Search
None
See application file for complete search history.

(56) References Cited

U.S. PATENT DOCUMENTS

| 8,199,010 B2 | 6/2012 | Sloan et al. | |
| 8,228,184 B2 | 7/2012 | Blakeley et al. | |
| 2010/0052574 A1 | 3/2010 | Blakeley et al. | |
| 2010/0052576 A1 | 3/2010 | Steiner et al. | |
| 2010/0207759 A1 | 8/2010 | Sloan et al. | |
| 2010/0277306 A1 | 11/2010 | Leinen et al. | |
| 2011/0074225 A1* | 3/2011 | Delnoij et al. | 307/117 |
| 2012/0068611 A1 | 3/2012 | Steiner et al. | |

FOREIGN PATENT DOCUMENTS

| WO | WO 2009/150584 A1 | 12/2009 |
| WO | WO 2011/105994 A1 | 9/2011 |

OTHER PUBLICATIONS

International Search Report issued in connection with International Application No. PCT/GB2013/052581, European Patent Office, dated Jun. 5, 2014.

* cited by examiner

*Primary Examiner* — Anh Tran
(74) *Attorney, Agent, or Firm* — McDonnell Boehnen Hulbert & Berghoff LLP

(57) ABSTRACT

A method for controlling a light, comprising: providing a first sensor device (11) comprising a first transmitter and a first occupancy sensor; providing a lighting controller (1) comprising a receiver and a second sensor; and transmitting an occupancy signal from the first transmitter to the receiver. The occupancy signal comprises a repeated cycle of transmission phases and silent phases, such that during a transmission phase the transmitter transmits and during a silent phase the transmitter does not transmit. The method further comprises activating the light when the second sensor is triggered; and deactivating the light after a period of time, the length of the period being determined at least in part by the occupancy signal transmitted by the first transmitter.

11 Claims, 2 Drawing Sheets

LIGHTING CONTROL SYSTEM

CROSS-REFERENCE TO RELATED APPLICATIONS

This application is a U.S. national stage of International Application No. PCT/GB2013/052581, titled "Lighting Control Method" and filed Oct. 3, 2013, which claims priority to European Patent Application No. 12187114.9, titled "Lighting Control System" and filed Oct. 3, 2012, each of which is incorporated by reference herein in its entirety.

BACKGROUND

For both environmental and cost reasons, it is important to reduce energy use wherever possible. One major source of wasted energy is lighting, with many electrical lights often being left on unnecessarily. Occupancy detectors are widely used to turn lights on and off automatically when a person enters and leaves a room, and so conserve energy by ensuring that an unoccupied room is not unnecessarily illuminated.

Typically, occupancy detectors work by detecting whether a person is in an area using PIR, microwave or ultrasonic sensors. They can be found in two basic forms: a presence detector, which turns lights on automatically when an occupant is detected, and then turns the lights off after an area is vacated; or an absence detector which requires a manual switch to turn lights on, but similarly turns lights off automatically after an area is vacated.

Normally occupancy detectors are either wall mounted or ceiling mounted. In a typical retrofit application, the lights are already turned on by a wall switch. Replacing this switch with a wall mounted sensor requires no extra wiring. However it is seldom the best place to put an occupancy sensor to give it coverage of the whole area, so there may be dead spots in the detection range. The best place to put an occupancy sensor to give maximum detection is usually on the ceiling, but retro-fitting a sensor to the ceiling will always require some extra wiring in order to switch the lighting circuit.

Wall mounted occupancy sensors present a further complication in that most installations will only have Live, Switched Live and Earth wires available at the light switch, with no Neutral connection. Without a Neutral connection it is difficult to generate power. Typically, existing wall mounted occupancy sensors will derive their power source through the lighting load or via Earth, but both of these methods impose a limit on the amount of current that can be drawn.

Therefore there exists a clear need for a lighting control system which is easy to retrofit in an existing building, while also giving the benefits of ceiling-mounted detection.

BRIEF SUMMARY OF THE DISCLOSURE

In accordance with the present inventions there is provided a method for controlling a light. The method comprises: providing a first sensor device comprising a first transmitter and a first occupancy sensor; providing a lighting controller comprising a receiver and a second sensor; and transmitting an occupancy signal from the first transmitter to the receiver. The occupancy signal comprises a repeated cycle of transmission phases and silent phases, such that during a transmission phase the transmitter transmits and during a silent phase the transmitter does not transmit. The method further comprises activating the light when the second sensor is triggered; and deactivating the light after a period of time, the length of the period being determined at least in part by the occupancy signal transmitted by the first transmitter.

In this way the invention can help to reduce power consumption by deactivating the light when the room is not occupied. In addition, since the first sensor device is not always transmitting, it uses less power than a conventional system which sends out a continuous stream of updates as to the occupancy of a room. Therefore the power demands of the first sensor device are lower, and it can be installed more easily, without the need for a dedicated power supply, or as powerful a supply.

In some embodiments, the mean length of the silent phases is longer than the mean length of the transmission phases. The mean length of the silent phases may be more than twice the mean length of the transmission phases. The mean length of the silent phases may also be more than ten times, a hundred times, or a thousand times the mean length of the transmission phases. Longer silent phases help to reduce power consumption in the sensor device. Shorter silent phases ensure that the system responds faster to an unoccupied room, and therefore reduce the power consumption in the light. Therefore it may be that the mean length of the silent phases is less than the mean length of the transmission phases.

The transmitter may be a transceiver which is used to transmit. The receiver may be a transceiver which is used to receive.

It may be that the occupancy signal comprises a first code, the first code being transmitted when the occupancy sensor detects an occupancy. Where the occupancy signal comprises a first code, it may be that the method further comprises deactivating the light if a first code is not received by the receiver for a predetermined period of time.

In this way a system using the method of the invention can provide lights which turn off automatically once a room is unoccupied.

It may be that the occupancy signal comprises a second code, the second code being transmitted when the occupancy sensor does not detect an occupancy. Where the occupancy signal comprises a second code, it may be that the method further comprises deactivating the light if a second code is received by the receiver.

This is a further way in which a system using the method of the invention can provide lights which turn off automatically once a room is unoccupied.

It may be that the occupancy signal comprises both the first and the second code.

The method described above may further comprise: activating the receiver when the second sensor is triggered; and deactivating the receiver after a period of time, the length of the period being determined by the occupancy signal.

In this way the power consumption of the lighting controller can be reduced, since the receiver is not active all the time. This means that the lighting controller can be installed without a dedicated power supply, for example it may take its charge from the lighting load it controls. Typically, the receiver will remain activated for as long as the light is activated.

Where the occupancy signal comprises a first code, it may be that the method further comprises deactivating the receiver if a first code is not received by the receiver for a predetermined period of time.

Where the occupancy signal comprises a second code, it may be that the method further comprises deactivating the receiver if a second code is received by the receiver.

The method may further comprise deactivating the receiver for a predetermined period of time when the occupancy signal is detected, and then reactivating the receiver. Since the occupancy signal is intermittent, power can be saved by operating the receiver in a similarly intermittent fashion. Typically, the receiver will remain deactivated for the expected length of the silent phase. The receiver can then be reactivated in time to receive the message sent during the transmission phase. Once the receiver is reactivated, if a signal is not detected the method may further comprise waiting at least one cycle, the length of one transmission phase and one silent phase, before the receiver or the lights are deactivated again. This step can help to ensure that the signal was not simply lost due to a temporary transmission error, or interference.

The method may further comprise: providing a second sensor device comprising a second transmitter and a second occupancy sensor; transmitting an occupancy signal from the first transmitter to the receiver; and deactivating the light after a period of time, the length of the period being determined at least in part by the occupancy signal transmitted by the second transmitter.

In this way multiple sensor devices can be used with a single lighting controller. This is useful where sensor devices must be used to monitor a large or awkwardly shaped room, such that a single sensor device is not sufficient. As many sensor devices as are required can be paired with the lighting controller, and function in the same way as the first or second sensor device.

The occupancy signal which is transmitted by the second transmitter may differ from the occupancy signal which is transmitted by the first transmitter. For example, the occupancy signal which is transmitted by the second transmitter may comprise a unique code, which identifies the signal as being transmitted by the second transmitter.

Typically, at least one occupancy sensor is a PIR sensor. PIR sensors do not use much power, and so are useful in low power consumption systems. However, if required other sensor devices can be used, such as active infra red, microwave sensors, pressure pads located in the floor or any other suitable occupancy sensor.

Typically, the first sensor device further comprises a lux sensor.

It may be that, where the first sensor device comprises a lux sensor, the first sensor device is configured to transmit an occupancy signal only if the light detected by the lux sensor is greater than a predetermined minimum.

In this way power consumption by the first sensor is further reduced. If the light level is below the predetermined level then this indicates that the lights in the room to be monitored are turned off. Therefore there is typically no need to generate an occupancy signal.

It may be that, where the first sensor device comprises a lux sensor, the occupancy signal will comprise a code indicating the light level detected by the lux sensor. The lighting controller may then further comprise a dimmer device for controlling the brightness of the light, the brightness of the light being determined at least in part by the occupancy signal.

In this way the light levels in a room can be maintained at a predefined level when the light is activated. This can useful in reducing power consumption, for example when there is some daylight and so the light can be dimmed.

The second and subsequent sensor devices may also comprise lux sensors.

Typically, the second sensor is a switch, button, lever or some other user-operable device. Alternatively, the second sensor could be another occupancy sensor.

Typically, at least one transmitter transmits the occupancy signal wirelessly.

It may be that the first sensor device comprises a battery. This can be advantageous since a battery powered sensor can be installed anywhere, without the difficulty of having to arrange a power supply. The battery may be rechargeable.

It may be that the lighting controller comprises a battery. Again, the battery may be rechargeable.

Secondly, the invention provides a lighting controller suitable for use in a method as described above.

Thirdly, the invention provides a sensor device suitable for use in a method as described above.

Fourthly, the invention provides a lighting control system, the lighting control system comprising at least a first sensor device as described above and a lighting controller as described above.

BRIEF DESCRIPTION OF THE DRAWINGS

Embodiments of the invention are further described hereinafter with reference to the accompanying drawings, in which.

DETAILED DESCRIPTION

Figure 1:
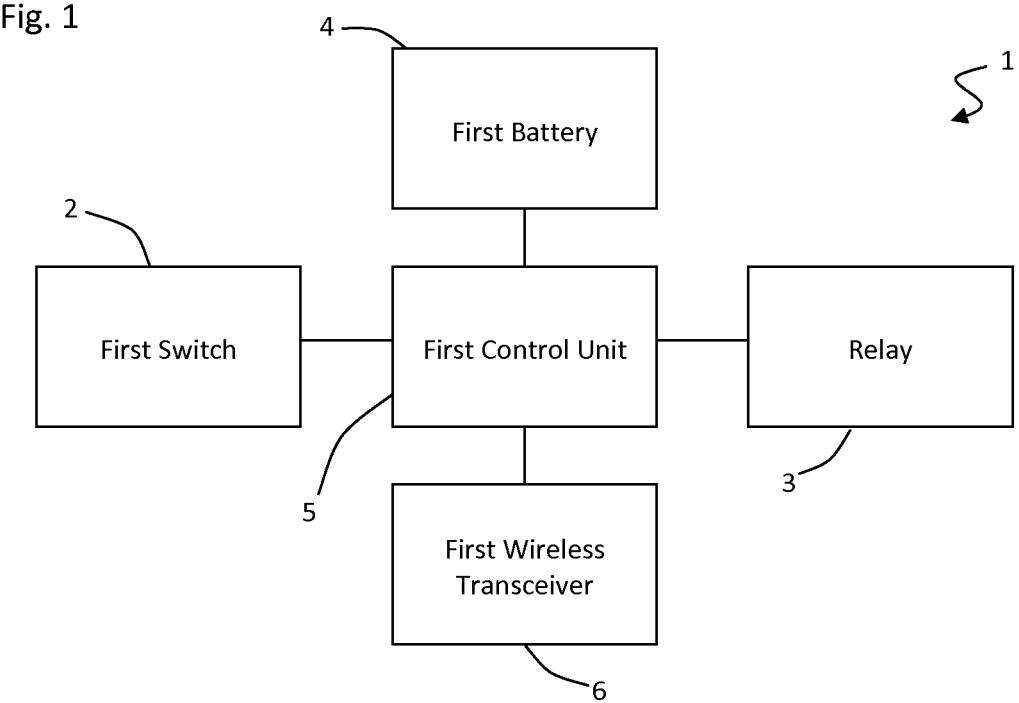
FIG. 1 is a schematic diagram of a lighting controller according to the invention.

FIG. 1 shows a lighting controller 1 according to the invention. The lighting controller 1 is suitable for use in place of an existing wall mounted light switch, and comprises a user operable switch 2 on the front of the device and an internal relay device 3. The relay device 3 is used to control the supply of power to at least one light, therefore the relay device 3 can be used to make a connection and so turn the lights on, or break the connection to turn the lights off.

The lighting controller 1 further comprises a first battery 4 and a first control unit 5. The first control unit 5 draws power from the first battery 4 to operate. The first battery 4 is a rechargeable battery which derives its charge current through the lighting load on the relay device 3. As such, when the first battery 4 is depleted through use, the first control unit 5 can cause the first battery 4 to recharge automatically, without the need for the first battery 4 to be removed or replaced. However, the first battery 4 can also be accessed and removed, if a user removes the front panel of the lighting controller 1. This allows the user to replace the first battery 4 if the performance of the battery becomes degraded through use.

Lastly, the lighting controller 1 comprises a first wireless transceiver 6, which also draws power from the first battery 4 to operate. The first transceiver 6 is a radio frequency transmitter and receiver suitable for wireless communication.

Figure 2:
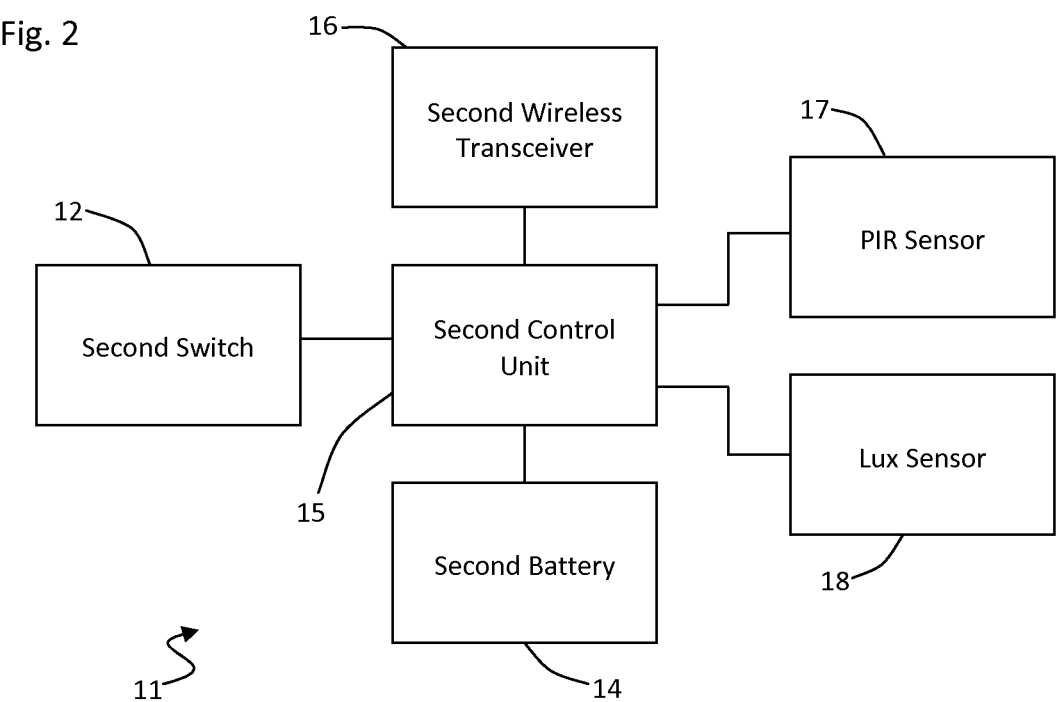
FIG. 2 is a schematic diagram of sensor device according to the invention.

FIG. 2 shows a sensor device 11 according to the invention. The sensor device 11 comprises a second switch 12, a second battery 14, a second control unit 15, and a second wireless transceiver 16. The second control unit 15 and the second wireless transceiver 16 both draw power from the second battery 14 to operate. The second wireless transceiver 16 is a radio frequency transmitter and receiver which is suitable for wireless communication with the first transceiver 6.

The sensor device 11 further comprises a passive infra-red (PIR) sensor 17 which can detect heat sources. This allows the sensor device 11 to function as an occupancy sensor, by detecting the movement of heat signals such as human bodies. Lastly, the sensor device 11 comprises a lux sensor 18 which can detect the levels of flux of at least some frequencies of visible light.

In operation, the lighting controller 1 and the sensor device 11 cooperate to control a light. Typically, the lighting controller 1 is installed in place of an existing light switch, and connected to the wires which supply power to one or more lights. The sensor device 11 can then be installed in the ceiling so that the PIR sensor 17 is provided with a good view of the surrounding area.

As the sensor device 11 is battery powered it has no need of an external connection. Thus the sensor device 11 can be easily retrofitted simply by screwing or sticking to the ceiling.

In a first operational mode, the sensor device 11 is always powered up and monitoring the occupancy status of the room using the PIR sensor 17. The sensor device 11 uses the second transceiver to send out a regular wireless message. If the PIR sensor 17 detects a person, the second transceiver 16 sends a first message. If the PIR sensor 17 does not detect a person, the second transceiver 16 sends a second message. Therefore the message sent indicates the occupancy status of the room. To conserve power, the wireless messages are discrete messages, and a message is sent every X seconds where X can be defined to meet the needs of the user. In between transmitting the wireless message, the second wireless transceiver is not transmitting, and so consumes less power.

When the light is turned off the first control unit 5 puts the lighting controller 1 in a standby mode, in which the first transceiver 6 is deactivated. Therefore very little electrical current is taken from the first battery 4.

When a person enters the room, they press the first switch 2 on the light controller 1. This causes the light controller 1 to wake up out of standby mode and make a connection using the relay 3 to turn the lights on. At the same time the first control unit 5 activates the first transceiver 6 and listens for a message from the local sensor device 11.

As soon as the first transceiver 6 receives an occupancy message from the second transceiver 16, the first control unit 5 synchronises itself with the message and turns off the transceiver. As the first control unit 5 is now synchronised it knows when to expect the next message and so the first control unit 5 can turn the first transceiver 6 on at the appropriate time to receive the next message. In this way the lighting controller 1 minimises power consumption. When the first transceiver 6 receives a message from the sensor device 11 which indicates that the room is now vacant, then the first control unit 5 turns off the lights and puts the lighting controller 1 back into a standby mode.

The sensor device can also be place in a second operational mode. In the second operational mode, the lux sensor 18 detects the levels of visible light in the room. If the light levels are below a predetermined minimum, then the second wireless transceiver is put into a standby mode and the occupancy messages are not sent. Even if an occupant has been detected, the room being dark indicates that the occupant has not turned on the light switch and therefore that the lighting controller 1 is still in a standby mode. Therefore not sending a regular message conserves power which would otherwise be wasted.

The sensor device 11 and the lighting controller 1 can also be placed in a third operational mode. When the sensor device 11 is placed into the third operational mode, the second wireless transceiver is put into a standby mode until the PIR sensor 17 detects an occupancy. When the PIR sensor 17 detects an occupancy, the second control unit activates the second transceiver 16 so that the second wireless transceiver begins transmitting a repeated message which confirms that the room is occupied. When the PIR sensor 17 detects that the room is no longer occupied, the second control unit 15 puts the second transceiver 16 back into a standby mode, so that it stops transmitting.

When the lighting controller 1 is in the third operational mode, the first control unit 5 will turn off the light and return the lighting controller 1 to a standby mode if a message is not received from the sensor device 11 for a predetermined period of time. Therefore the lights will remain on while the room is occupied, but turn off when the room is unoccupied for a predetermined period of time. Also, if a person activates the light using the first switch 2, but does not go far enough into the room to be picked up by the PIR sensor 17, the lights will turn on for a predetermined time period then turn off automatically.

The sensor device 11 can also be put into a fourth operational mode which combines the features of the second and third operational modes, so that the second transceiver transmits only when the visible light is above a predetermined level and an occupancy is also detected.

The sensor device 11 and the lighting controller 1 can also be put into a fifth operational mode. In the fifth operational mode, the second wireless transceiver is put into a standby mode when the PIR sensor 17 detects an occupancy. When the PIR sensor 17 does not detect an occupancy, the second control unit activates the second transceiver 16 so that the second wireless transceiver begins transmitting a repeated message which confirms that the room is not occupied. When the PIR sensor 17 detects that the room is occupied again, the second control unit 15 puts the second transceiver 16 back into a standby mode, so that it stops transmitting.

When the lighting controller 1 is in the fifth operational mode, the first control unit 5 will turn off the light and return the lighting controller 1 to a standby mode when a message is received from the sensor device 11.

The sensor device 11 can also be put into a sixth operational mode which combines the features of the second and fifth operational modes, so that the second transceiver transmits only when the visible light is above a predetermined level and an occupancy is not detected.

The third and fifth operational modes are less robust than the first operational mode, as interference in the signals is more likely to cause the lighting controller 1 to behave erratically. For example, if the lighting controller is set to the third operational mode and the signal from the sensor device 11 does not transmit properly, the light may turn off while the room is still occupied. However, the third and fifth operational modes do significantly reduce the number of transmissions, and as such save power. Whether the third or the fifth operational mode is most advantageous will usually depend on whether a light will spend more time turned on or turned off.

Figure 3:
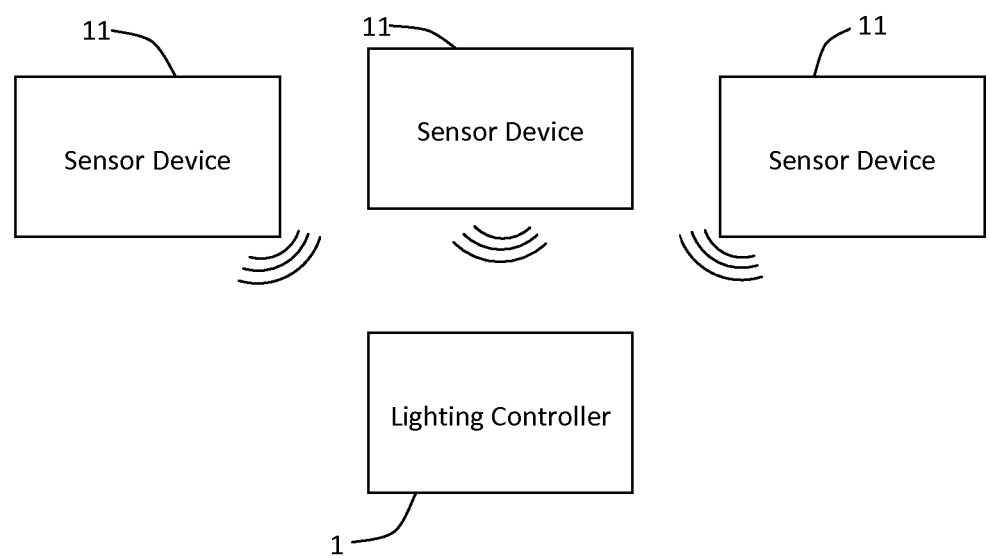
FIG. 3 is a diagram of a lighting control system comprising a lighting controller and three sensor devices.

The lighting controller 1 can be used with a plurality of sensor devices 11. This is useful in large or awkwardly shaped rooms, in which it would be difficult to cover the entire room with a single sensor device 11. FIG. 3 illustrates just such a lighting control system, in which three sensor devices 11 communicate with a lighting controller 1. The sensor devices 11 and the lighting controller 1 function as described above. If the lighting controller 1 is set to the first mode, then the sensor devices 11 can be set to the first or second modes. Alternatively, if the lighting controller 1 is set to the fifth mode, then the sensor devices 11 can be set to the fifth or sixth modes. Then the lighting controller 1 will turn the lights off when it receives messages from all three of the sensor devices 11 indicating that the room is unoccupied. In this way, a person in the room can be within sight of any of the sensor devices 11 and the light will remain on.

Similarly, if the lighting controller 1 is set to the third mode, and the sensor devices are set to the third or fourth mode, then the lighting controller 1 will turn the lights off when it does not receive a first message from any of the sensor devices 11 for a predetermined period of time.

In order to allow multiple lighting controllers 1 to be used in the same building, each with their own sensor devices 11, a system of pairing is employed. To pair a first sensor device 11 with a first lighting controller 1, the user operates the first switch 2 on the first lighting controller 1 in a predefined sequence so as to put the first lighting controller 1 into a pairing mode. The user then operates the second switch 12 on the first sensor device 11 in a predefined sequence so as to also put the first sensor device 11 in a pairing mode. In this mode the first sensor device 11 communicates a first unique code to the first lighting controller 1, which the first lighting controller 1 stores. The first lighting controller 1 and the first sensor device 11 then leave the pairing mode. The sensor device 11 then includes the first unique code as part of any message it transmits, and the lighting controller 1 responds only to messages which contain a unique code which it has stored. Therefore the first lighting controller 1 will respond to messages from the first sensor device 11 which contain the first unique code, but the first lighting controller 1 will ignore messages from a nearby second sensor device, with which it has not been paired. The second sensor device can be paired with a second lighting controller, so that the second lighting controller responds to messages from the second sensor device. The first lighting controller 1 can be paired with as many sensor devices 11 as is required.

In a further embodiment, the relay 3 may comprise a dimmer device, such that the lighting controller 1 can vary the brightness of the light it controls. The user can then vary the brightness by operating the first switch 2. If the user desires it, the first sensor device 11 can be configured to transmit the light level detected by the LUX sensor 18. The first control unit 5 then uses this information to vary the brightness of the light to keep the light levels in the room at a constant level as determined by the user.

Both the first control unit 5 and the second control unit 15 comprise an internal clock, and can be configured to enter a standby mode at certain times, for example during the hours of daylight. In the standby mode the transceivers 6, 16 and the sensors 17, 18 do not operate and the light remains turned off even if the first switch 2 is operated. This can help to further reduce power consumption.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A lighting control system for controlling at least one electrical light, the system comprising:
   a sensor device comprising a wireless transmitter and an occupancy sensor; and
   a lighting control device comprising a wireless receiver, a user-operable switch and an electrical circuit for controlling the power supply to the light,
   wherein the sensor device is configured to transmit periodically via the wireless transmitter an occupancy signal for receipt by the wireless receiver, the occupancy signal being indicative of the presence of a person in the detection range of the occupancy sensor,
   the lighting control device is operable in a standby mode and an active mode and is configured to enter the active mode from the standby mode in response to the actuation of the user-operable switch by a user,
   in the standby mode, the wireless receiver is inactive and the electrical circuit does not supply electrical power to the light,
   on entering the active mode, the electrical circuit supplies electrical power to the light and the wireless receiver is activated until it receives an occupancy signal from the wireless transmitter and is then deactivated, and
   during the active mode the wireless receiver is activated at the expected time of the next periodic transmission of the occupancy signal and deactivated after receipt of the occupancy signal, until the occupancy signal is not received by the wireless receiver, after which the lighting control device re-enters the standby mode.

2. The lighting control system according to claim 1, wherein the lighting control device is configured to enter the standby mode from the active mode after a predetermined period of time if the occupancy signal is not received.

3. The lighting control system according to claim 1, wherein the sensor device is configured to transmit an absence signal for receipt by the wireless receiver, the absence signal indicating that the occupancy sensor has ceased to detect the presence of a person in its detection range, and the lighting control device is configured to re-enter the standby mode if the absence signal is received at the expected time of the next periodic transmission of the occupancy signal.

4. The lighting control system according to claim 1, wherein the sensor device is configured to start transmitting the occupancy signal in response to detection of the presence of a person in the detection range of the occupancy sensor.

5. The lighting control system according to claim 1, wherein the sensor device comprises a light level sensor and the sensor device is configured to start transmitting the occupancy signal in response to detection of a light level indicative of the light being on.

6. The lighting control system according to claim 1, wherein the sensor device comprises a light level sensor and the sensor device is configured to activate the occupancy sensor in response to detection of a light level indicative of a light being on.

7. The lighting control system according to claim 1, wherein the occupancy signal is characteristic of the particular sensor device and the wireless receiver is configured to be responsive to the occupancy signal received from a particular sensor device.

8. The lighting control system according to claim 1, wherein the occupancy sensor is a passive infra-red sensor.

9. The lighting control system according to claim 1, wherein the sensor device is battery-powered.

10. The lighting control system according to claim 1, wherein the lighting control device is battery-powered.

11. The lighting control system according to claim 3, wherein the occupancy signal and the absence signal are characteristic of the particular sensor device and the wireless receiver is configured to be responsive to the occupancy signal received from a particular sensor device.

* * * * *